H. C. RITCHIE AND M. KAHN.
REINFORCED CONCRETE CONSTRUCTION OF SHIPS, FLOATING DOCKS, PONTOONS, AND THE LIKE.
APPLICATION FILED AUG. 7, 1918.

1,375,179.

Patented Apr. 19, 1921.

Inventors:
Harry C. Ritchie,
Moritz Kahn,

UNITED STATES PATENT OFFICE.

HARRY C. RITCHIE, OF LIVERPOOL, AND MORITZ KAHN, OF LONDON, ENGLAND.

REINFORCED CONCRETE CONSTRUCTION OF SHIPS, FLOATING DOCKS, PONTOONS, AND THE LIKE.

1,375,179. Specification of Letters Patent. Patented Apr. 19, 1921.

Application filed August 7, 1918. Serial No. 248,780.

*To all whom it may concern:*

Be it known that we, HARRY CLEMENT RITCHIE, a subject of the King of Great Britain, and residing in Liverpool, in the county of Lancaster, England, and MORITZ KAHN, a citizen of the United States, and residing in London, England, have invented certain new and useful Improvements in Reinforced Concrete Construction of Ships, Floating Docks, Pontoons, and the like, of which the following is a specification.

This invention relates to reinforced concrete ship construction and the object is to provide a practical and efficient mode of construction permitting a minimum thickness of plating and scantlings. Further objects, such as, elimination of difficulties due to shrinkage, increased facilities for repair work and greater freedom to the designer in the new shipbuilding material, will transpire as the invention and the mode of carrying it into operation are disclosed in what follows.

To those experienced in the behavior of concrete as a structural material, it is well known that it is practically impossible to construct thin slabs of any considerable length which will not crack on maturing; further that the positions where cracking will take place cannot be determined beforehand, because many varying factors affect the conditions resulting in the cracks, *e. g.* the positions of "breaking off" and jointing during construction, lack of uniform quality of concrete, varying thickness, varying atmospheric conditions during construction, and so on, as well as the positions of reverse bending. The construction of a concrete boat, even of relatively short length, with a thin shell in the ordinary monolithic manner would for these reasons be attended with considerable difficulties; cracks and leaks would inevitably follow and efficient repair would be exceedingly difficult. It has been proposed to protect a steel ship with an outer protective skin formed of multiple layers of pre-cast reinforced concrete flanged slabs which are subsequently assembled with the flanges abutting, the joints between the flanges being made water-tight by cement keys and in other ways, and it has been proposed that an entire ship could be constructed of slabs shaped assembled in multiple layers and jointed, as above described; the stresses to which a ship's hull are subjected are however such as can only be provided for in ships of even moderate size by suitably disposed continuous main frame members and the present invention differs from the suggested arrangement for building entire ships of slabs in the manner described, inasmuch as according to the present invention the reinforced concrete ship is built up of units separately molded and matured and of suitable frame members cast *in situ;* the unit sections are of such shape as to be adapted to be readily jointed together and the general design is such that the main through members can be cast *in situ* about the said sections as the latter are assembled and such that a continuous system of cross-bracing and auxiliary through members can be applied to provide for the usual stresses met with in such structures.

One set of main frame members, say the transverse frame members are preferably pre-molded integral with the shell units, the said members being connected together through or within the frame members cast *in situ*, in which case such units correspond in shape with units which would be obtained if a steel hull were divided by a series of transverse planes passing through the centers of the frames, and by a series of planes normal to the shell and passing through the main longitudinal members of the ship. Such units therefore have a width equal to the longitudinal spacing of the transverse frames, as determined by Lloyd's rules, and a length equal to the transverse spacing of the main longitudinal members. Each unit thus comprises a slab provided with flanges, the slab corresponding with the plating and the flanges with the transverse frames, said flanges forming jointing surfaces of considerable extent, the two connected flanges of adjacent slabs thus forming the one frame. One tier of such units would extend vertically from the sheer strake to the next side stringer and so on; suitably curved units extending from the stringer at the junction of side frames and bilge frames to the bilge keelson, and horizontally arranged units extend from the bilge keelson to the middle keelson, the flanges of the units in the latter case forming the floor plates or transverse beams in the construction of the bottom.

The transverse deck members with suitable provision for hatch coamings are formed in the same manner, and in each case as the units are assembled the longitudinal members of reinforced concrete are constructed *in situ*, the steel reinforcement of the units projecting from the ends so as to afford means of connection between the units and between the units and the longitudinal members so as to form a single integral reinforced structure.

In order to reduce the thickness of the slabs to a minimum, the slabs are reinforced in both directions and are for this purpose divided in squares, stirrups being left protruding from the inside faces to take secondary beams.

Openings are provided in the sides or flanges of the units through which pass the main reinforcing bars of the secondary beams, which bars are anchored to the slabs and run continuously across the abutting faces of the units. These reinforcing bars may in some cases run diagonally through the openings, the ends of the bars being anchored at intervals into the main longitudinal concrete members which are cast *in situ*.

This diagonal arrangement has great advantages as an efficient means of resisting not only the shearing forces in the sides of the ship acting as the web of a deep girder, but also in the resistance of racking or torsional stresses across the whole transverse section of the ship.

The unit sections can be cast in a horizontal position on the ground or on benches, and owing to their small size could be much more efficiently supervised during construction than would be possible otherwise. Also they could be tested individually after maturing and before being incorporated in the ship structure.

In the present proposed system of construction, the transverse unit has been adopted because the transverse structural strength of a ship is less variable than the longitudinal strength, and further because the transverse members as specified by Lloyd's and other such societies in the case of steel built ships, are more readily translated into their equivalents in reinforced concrete.

The invention is however, equally applicable to unit sections other than the transverse sections described, should the special requirements of any case call for such modifications.

The invention is illustrated in the accompanying drawings which show the application of the invention to a ship of moderate size.

In the drawings, Figure 1 is a perspective view of one of the unit sections extending from the sheer strake to the next lower main stringer, portions of the two adjacent sections being shown to indicate the mode of jointing and portions of the longitudinal members being shown to indicate the mode of attachment and the mode of diagonal bracing.

Fig. 14 is a similar view of the bilge keelson and Fig. 15 a similar view of the center keelson.

Fig. 16 is a transverse section through a deck beam unit and shows the detail of the hatch coaming.

Figures 1, 14, 15, 16:
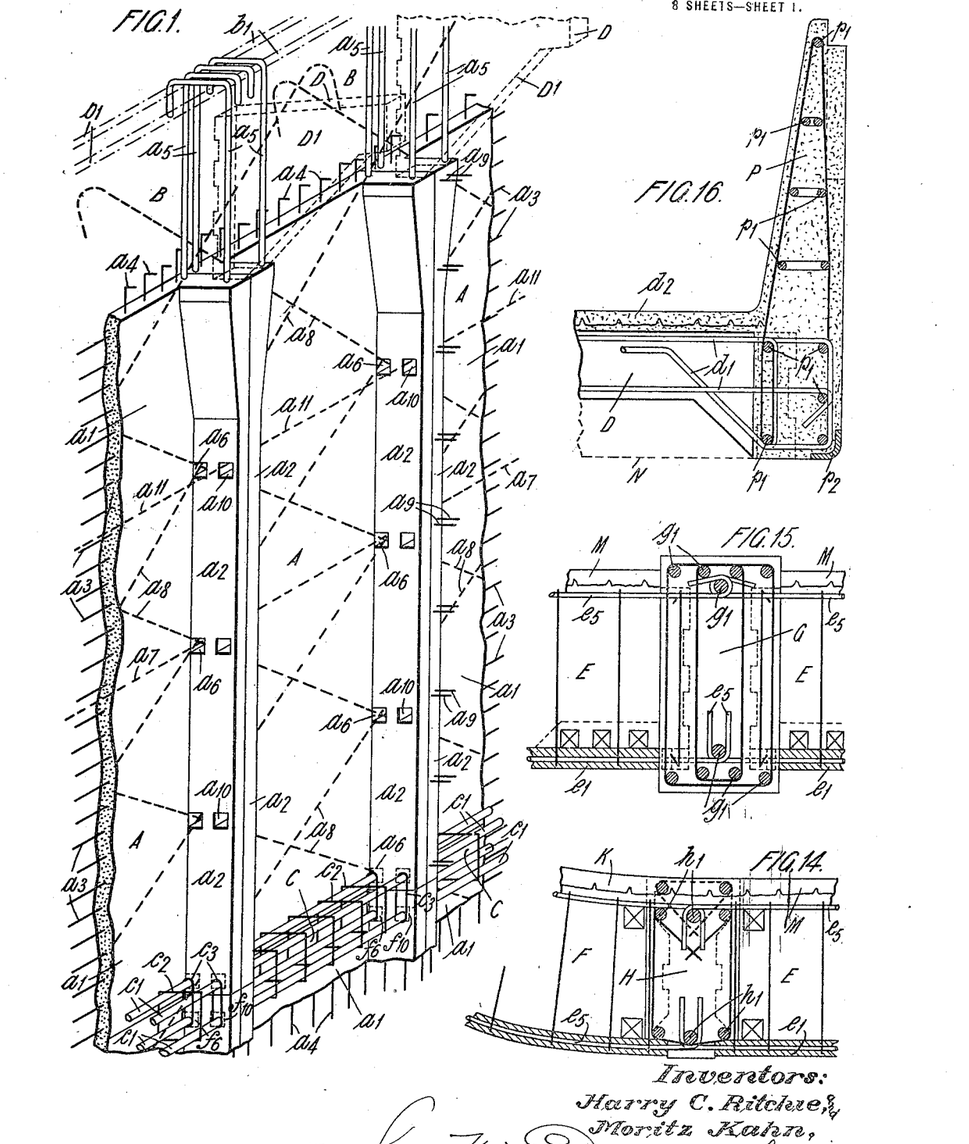

Referring in the first instance to Fig. 1:—
The unit section A is adapted to extend from the sheer-strake B to the next side stringer C. $a^1$ is skin or shell plating, $a^2$ the flanges or sides, adjacent pairs of which form the transverse frames. $a^3$ are the horizontal and $a^4$ the vertical reinforcing bars of the shell; the horizontal bars $a^3$ are anchored in the flanges $a^2$, forming therein shear resisting stirrups, and the vertical bars $a^4$ may protrude at their upper ends and be anchored into the sheer strake.

$a^5$ are the main reinforcement bars of the flanges or sides $a^2$; at their upper ends they are hooked around the main reinforcement bars $b^1$ of the sheer strake and at their lower end they pass around the lowermost of the holes $a^6$ and in this way are united to the main reinforcement bars $c^1$ of the side stringer C.

The upper ends of the flanges or sides $a^2$ are widened to support the knees D' of the deck beams D (shown in dotted lines in Fig. 1), and the ends of these beams are transversely indented as shown, so as to make effective joint with the sheer strake when the latter is molded in position.

The joints between adjacent sides or flanges of the unit are made by bringing the faces of these flanges into alinement (as shown in Fig. 1), a minimum space being left between the faces, which spaces are afterward run in with a grouting of cement or the like.

Figure 4:
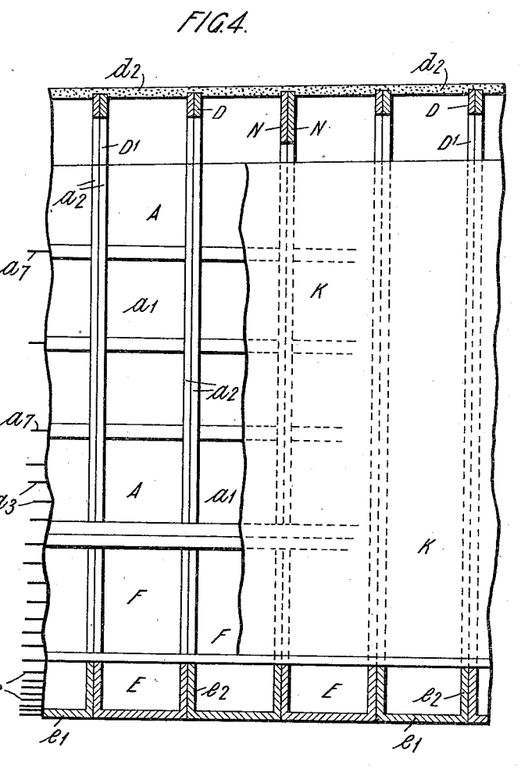
Fig. 4 is an elevation in section on the line IV, IV of Fig. 3.
Figure 5:
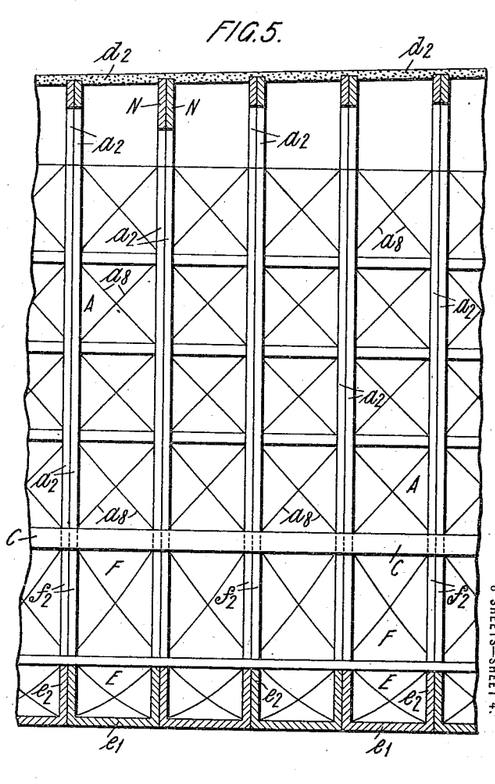
Fig. 5 is a similar view but shows the method of diagonal reinforcement.

Holes $a^6$ which come into alinement are provided in the flanges, and through these holes are threaded either longitudinal bars $a^7$ as shown, for example, on the left hand side of Fig. 4, or diagonal bars $a^8$, as shown in Figs. 1 and 5; or of course both diagonal and longitudinal bars may be fitted.

Figures 2, 11, 13:
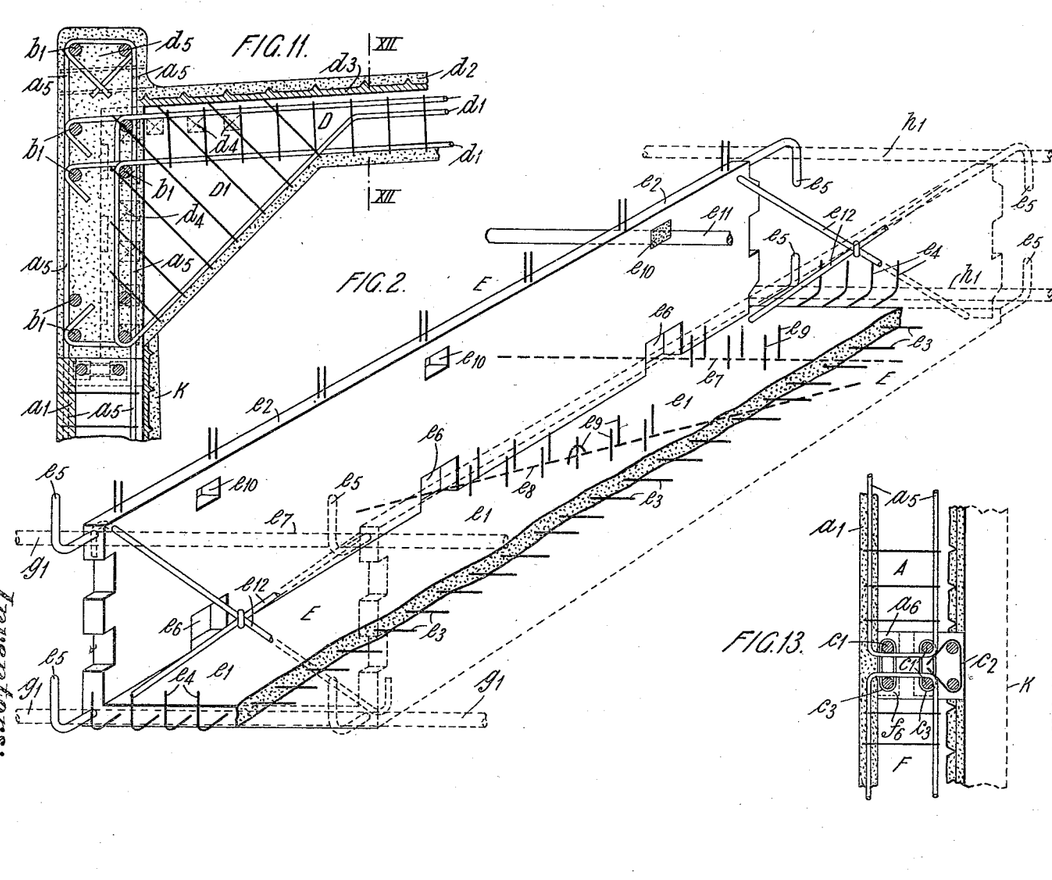
Fig. 2 is a perspective view of a unit section suitable for floor plates and bottom shell plating.
Fig. 11 is a transverse section through the sheer strake, to an enlarged scale, showing details of construction and connections to the shell and frame units and to the deck, deck beams and gunwale.
Fig. 13 is a vertical section through one of the side stringers.

Projecting stirrups such as $e^9$, shown in Fig. 2, may protrude from the slab so that the bracing bars run between the stirrups which are turned over as shown in Fig. 2, and in this way securely anchor the reinforcement bars to the slab.

The upper ends of the reinforcement bars $a^8$ are hooked into the sheer strake as shown in Fig. 1, and the lower ends are hooked into the next main longitudinal below the sheer strake—in this case the side stringer C; this stringer, after the side row of units A and the bilge units F (see Fig. 3) have been assembled, is formed by running the main reinforcement bars $c^1$ of the side stringer through the holes $a^6$ and $f^6$, which bars are supplemented by further bars as shown in the detail of this stringer in Fig. 13, the bars being united by strap links $c^3$ and stirrups $c^2$, after which this stringer is molded *in situ* and forms a horizontal member uniting the horizontal abutting surfaces of the units A and F.

Projecting stirrups $a^9$ are fitted to the inner edges of the flanges of the units and are adapted to form attachments for the inner lining K where one is fitted. This lining may be of cement, plaster or any other suitable fibrous composition, wood or the like. Additional and outer holes $a^{10}$ may be formed in the flanges to take additional longitudinal bars such as $a^{11}$ which may be required for additional strength, said bars being attached to the flanges by being grouted in; or such bars may be used to form intermediate side stringers which would be cast *in situ*, as shown at Q in Fig. 3.

Figure 3:
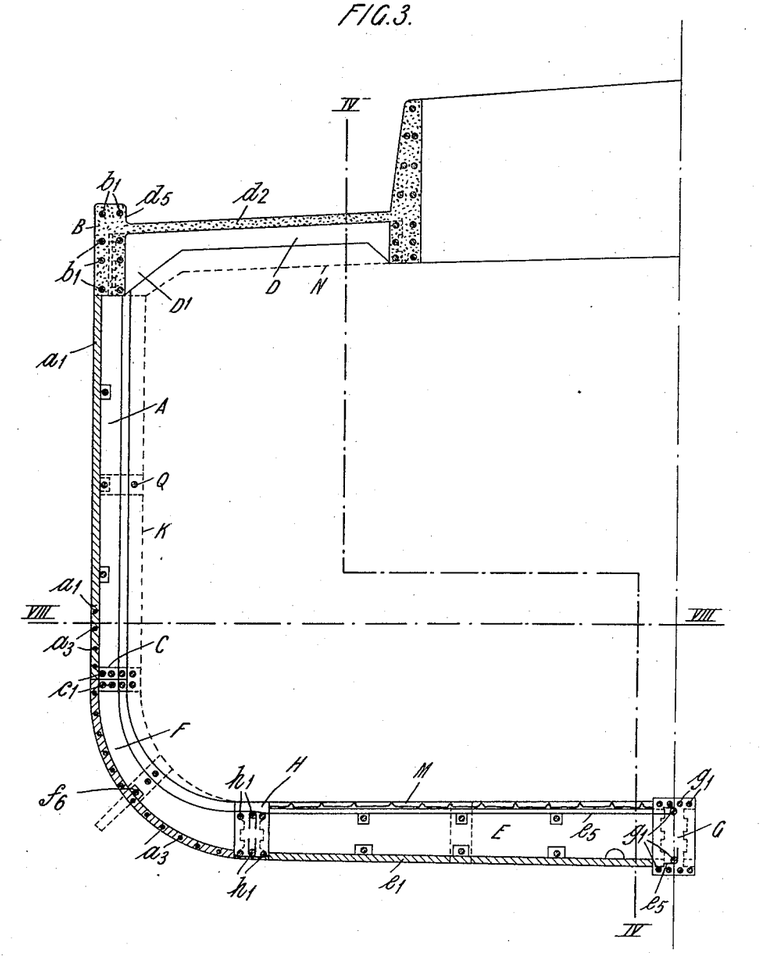
Fig. 3 is a half mid-ship section showing the several kinds of sectional units joined together by the longitudinal members.
Figure 10:
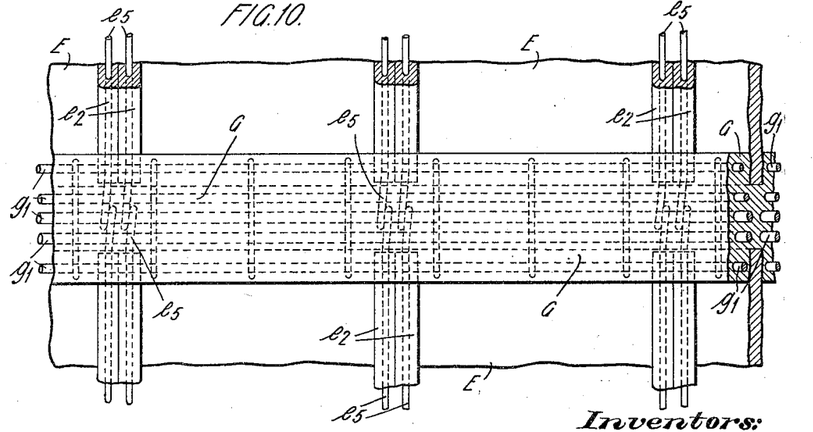
Fig. 10 is a fragmentary plan view showing the mode of attachment to the center keelson.

Referring now to Fig. 2, which shows the unit E which forms the bottom shell plating and the floor plates,—a portion of this unit in Fig. 3 is cut away, to show the shell plating reinforcement, the portion cut away being shown by dotted lines. $e^1$ is the shell plating or skin; $e^2$ the flanges or sides which form the floor plates; $e^3$ and $e^4$ are, respectively, the fore and aft and transverse shell reinforcement bars; $e^5$ are the main reinforcement bars, and they protrude and are turned over and are anchored at the central part into the main bars $g^1$ of the center keelson G as shown in Figs. 10 and 15, and at the other end are anchored into the main reinforcement bars $h^1$ of the bilge keelson H, as shown in Fig. 14; the transverse bars $e^4$ of the shell plating also project and are anchored into the center keelson at the one end and into the bilge keelson at the opposite end. The ends of the flanges or floor plates are indented as shown so as to form a key at the one end with the center keelson and at the other end with the bilge keelson. $e^6$ are the holes in the floor plates, through which longitudinal bracing bars $e^7$ or diagonal bracing bars $e^8$ pass.

$e^9$ are the projecting stirrups which when fitted in the shell plating are used for anchoring the bracing bars and which, when fitted to the edge of the floor plates are used to take a self-centering open work steel reinforcement sheeting, now well known as "hy-rib," to which sheeting the bilge ceiling M (see Fig. 3) is attached, since ordinary wood centering could not be used for this purpose as it could not be removed after the ceiling had been fitted.

$e^{10}$ are the outer holes through which auxiliary longitudinals $e^{11}$ pass when these are fitted. $e^{12}$ are diagonal tie-bars which are at the ends of the floor sections. The main function of these tie bars is to stiffen the center keelson and the bilge keelson, by forming connected cross bracing when embedded in these members.

The bottom units are assembled, and the joint between the abutting flanges is made as described, and the bilge keelson and center keelson are then built *in situ*.

Figure 6:
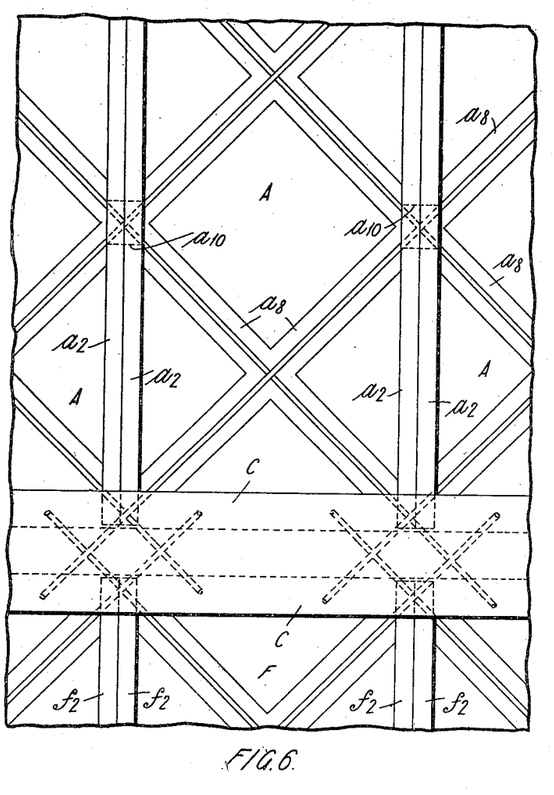
Fig. 6 is a fragmentary view of a part of Fig. 5 but to a larger scale.
Figure 8:
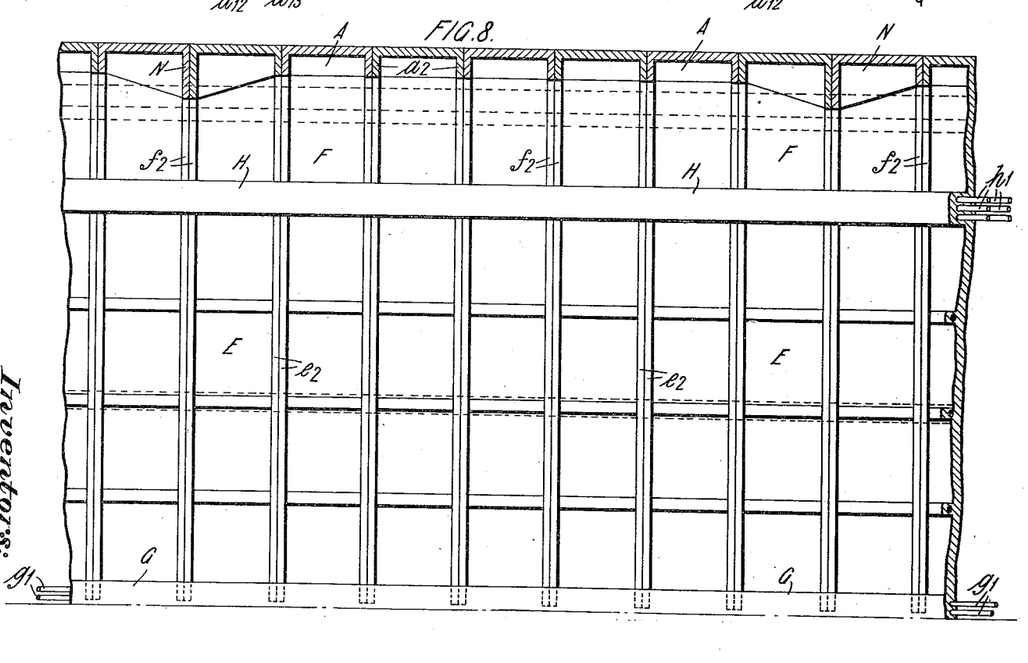
Fig. 8 is a plan view in section on the line VIII, VIII of Fig. 3.
Figure 9:
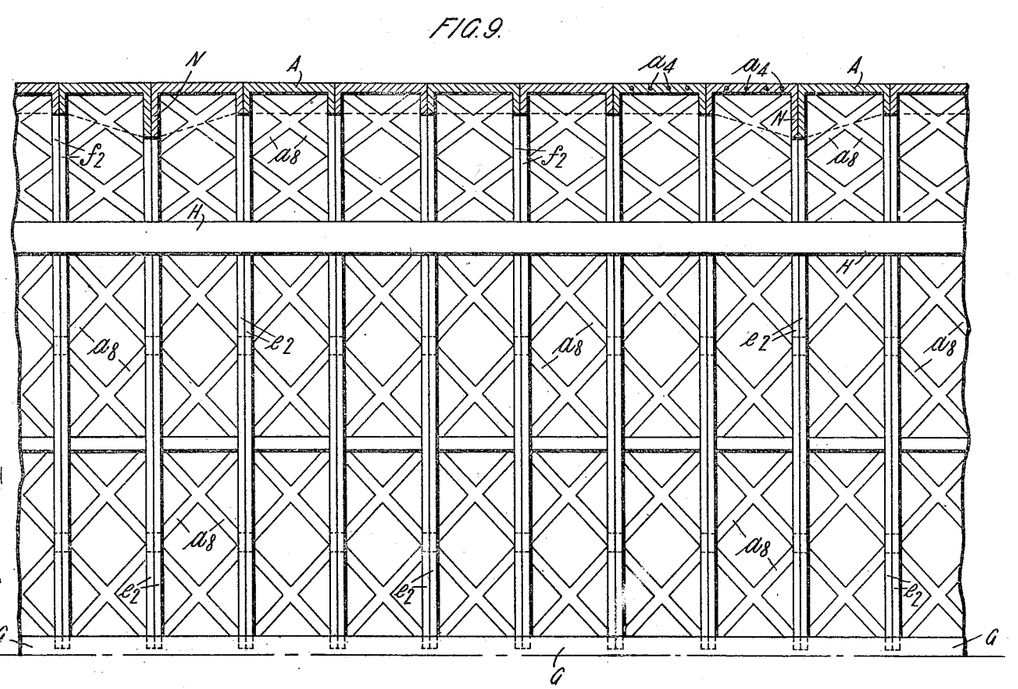
Fig. 9 is a similar view but shows the method of diagonal reinforcement.

The arrangement of the side units, the bilge units and the floor units in relation to the sheer strake, side stringer, bilge keelson and center keelson, are shown in Figs. 3, 4, and 5 in elevation, and in Figs. 8 and 9 in plan. In Figs. 4 and 8 the reinforcement bars are arranged longitudinally; in Figs. 5 and 9 they are arranged diagonally, and further details of the diagonal arrangement are given in the enlarged fragmentary view Fig. 6.

Figure 7:
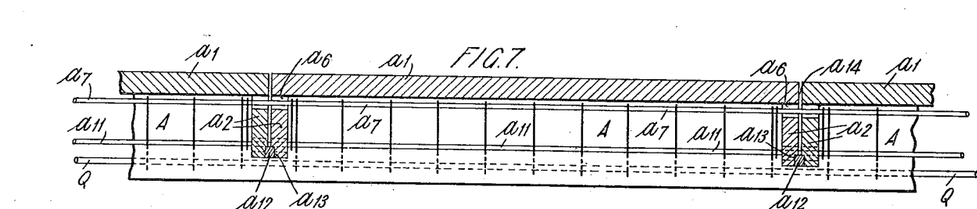
Fig. 7 is a fragmentary horizontal section to still larger scale, showing two frames and the intervening shell plate.

The joints between the flanges of the units are made watertight as shown in the sectional view Fig. 7, which is a horizontal section taken through the side plates.

In this case the flanges are keyed together by forming recesses $a^{12}$, which recesses are filled with bitumen or the like calking material 13, and this of course may also be done in the case of the floor and bilge units.

The frame faces may be keyed in any suitable manner to prevent lateral displacement, and at intervals the flanges are made of additional depth to form web framing N, as shown in Figs. 3, 4, 5, 8 and 9.

Figure 12:
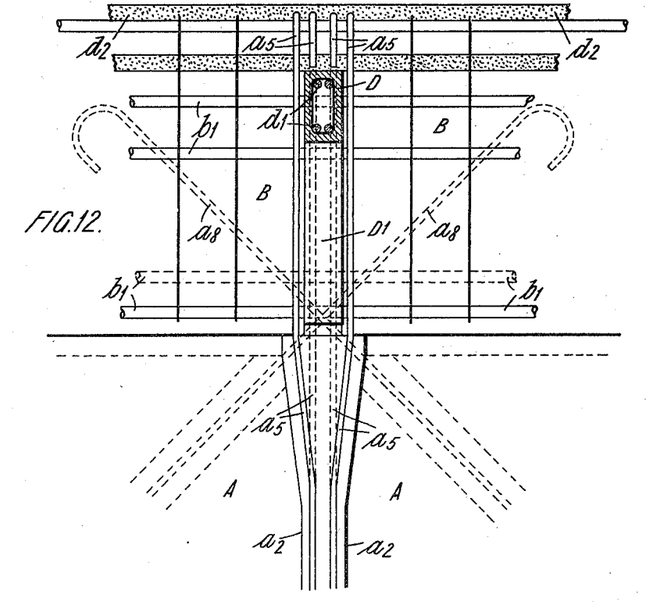
Fig. 12 is a corresponding elevation in section on the line XII, XII of Fig. 11.

The construction of the sheer strake and the mode in which the deck units and side units are attached to the sheer strake is shown in Figs. 11 and 12; the deck beams D are cast as units and the deck $d^2$ is cast *in situ*, preferably in hy-rib concrete, $d^3$ showing the hy-rib sheeting which is used in this connection. Additional holes $d^4$ are provided for additional longitudinals if required, and the gunwale $d^5$ is formed as shown integrally with the sheer strake, and is fitted with bulwark or open rails in any convenient manner.

Fig. 12 shows how the diagonal reinforcement bars are anchored into the sheer strake.

Figure 17:
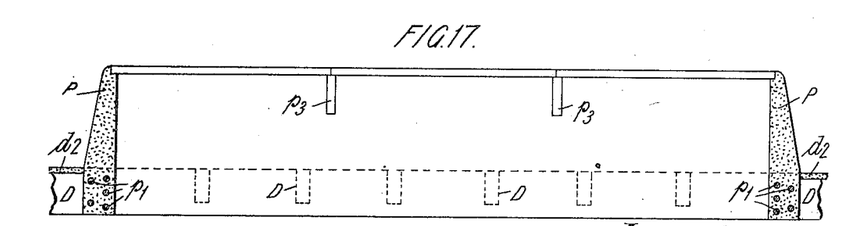
Fig. 17 is a sectional elevation of the hatch way and coaming.

Figs. 16 and 17 show the details of the hatch coamings P. The hatch coamings are cast *in situ* and united to the deck beams by anchoring the reinforcement bars $d^1$ of the latter to the reinforcement bars $p^1$ of the hatches. Protecting plates $p^2$ of steel are let into the concrete where necessary. Slots $p^3$ consisting of box ended steel channels are formed in the hatch coamings to take the hatch webs which support the usual hatch covers.

Transverse bulkheads are constructed either on the unit system described, or they may be cast *in situ*, and the extreme forward and stern sections, where the lines of the ship have considerable curvature, are constructed of sections specially molded to shape; in some cases the stern post or other members may be of cast or forged steel construction, so shaped and fitted with anchoring pieces as to be incorporated in the concrete hull. Longitudinal members cast *in situ* run through the decks, usually on opposite sides of the hatchways where they are made integral with the hatch coamings, and the longitudinal members join and support the deck beams. Columns, also cast *in situ* are provided where necessary in the line of the longitudinal members, which latter, at the several decks, are arranged in vertical alinement.

The provision of extra holes such as $a^{10}$, $e^{10}$ and $f^{10}$ through the sides of the units afford considerable latitude to the designer in the matter of additional strengthening members. Naked bars grouted into the sides of the units may be used and the behavior of these in the unsupported parts between the sides would disclose any weakness by buckling and could then be stiffened by completing the reinforced concrete construction along the lines of weakness shown. This feature of the invention is of value in a new industry, wherein the absence of accumulated data, considerable excess of material is frequently employed in cases of doubt.

The system of construction according to the present invention however, would permit of efficient repair, as any number of unit sections affected by the damage could with little difficulty, be removed and replaced by new units, matured prior to being placed, thereby overcoming the difficulties resulting from shrinkage.

The abutting faces of all unit sections are as described "keyed" for the purpose of making the joints, which are to be "run" with waterproofed cement grout. It will be noted that these joints occur nowhere in the thin slabs forming the sides and bottom of the ship, but that they are of the full depth of the flanges $a^2$ in the case of the sides and of the depth of the floor plates $e^2$ and $f^2$ in the case of the bottom, thereby making possible water-tight connections.

A careful examination of the stresses will show that there is no structural weakness due to the vertical joints between the flanges of the units as compared for instance with continuous longitudinal shell plating; it will be seen that if the whole steel section of the reinforced concrete shell were made continuous and equivalent in sectional area to the shell plating specified by Lloyds, the concrete section would be prohibitive; but it will be noted that it is possible in accordance with the present invention and, by means of the holes provided in the frames to pass continuous longitudinal steel, from end to end of the ship, having a cross sectional area at least equal to the maximum sectional area of slab reinforcement which would be continuous in the sides or bottom of any ship constructed in the usual monolithic manner of reinforced concrete.

The side plating for the most part in the case of a steel ship is of comparatively little value so far as the resistance of tensile stresses due to hogging and sagging are concerned, on account of its proximity to the neutral axis, and its chief function, apart from holding out the water or holding in the cargo, is that of the web of a plate girder, resisting the shearing forces. And in the present system of design, means of resisting these stresses are provided as described.

It is to be understood that the example illustrated is given by way of example, and that the invention as claimed herein is capable, in respect of details of construction, of considerable modification to meet the requirement of different types of ships and building conditions.

Having now particularly described and ascertained the nature of our said invention, and in what manner the same is to be performed, we declare that what we claim is:—

1. In a reinforced concrete ship, in combination; a series of pre-cast reinforced units each consisting of a plane part and two end flanged parts; reinforcing bars passing through the said flanged parts and projecting through the ends thereof and adapted with the flanges to form sections of one of the ship's frame members; reinforcing bars in the plane portions projecting beyond the edges thereof; and frame members of the ship consisting of reinforcing bars and concrete, cast *in situ*, at right angles to the frame, of which the flanges of the units form parts; the said pre-cast units being connected together end to end by joints made between the faces of the flanges and being connected together at their edges by the frame members cast *in situ*, the reinforcing bars of the flanges being connected together in the members cast *in situ* and forming continuous frame members running in the one direction connected at intervals to the cast *in situ* frame members running in a direction at right angles; substantially as described.

2. In a reinforced concrete ship, in combination, a series of pre-cast reinforced units each consisting of a plane part and two end flanged parts; reinforcing bars passing through the said flanged parts and projecting through the ends thereof and adapted with the flanges to form sections of one of the ship's frame members, reinforcing bars in the plane portions projecting beyond the edges thereof, frame members of the ship consisting of reinforcing bars and concrete, cast *in situ*, at right angles to the frame members of which the flanges of the units form parts, and diagonal reinforced secondary frame members cast *in situ*, the said pre-cast units being connected together end to end by joints made between the faces of the flanges and being connected together at their edges by the frame members cast *in situ*, the reinforcing bars of the flanges being connected together in the members cast *in situ* and forming continuous frame members running in the one direction connected at intervals to the cast *in situ* frame members running in a direction at right angles, said diagonal reinforced secondary frame members passing diagonally through the frame members formed by the flanges and having their ends connected together in the frame members cast *in situ*, substantially as described.

3. In a reinforced concrete ship, in combination, a series of pre-cast reinforced units each consisting of a shell part and two end flanged parts, reinforcing bars passing through the said flanged parts and projecting through the ends thereof and adapted with the flanges to form sections of the transverse frames of the ship, reinforcing bars in the shell portion projecting beyond the edges thereof, and longitudinal frame members of the ship consisting of longitudinal reinforcing bars and concrete cast *in situ*, the said pre-cast units being connected together end to end by joints made between the faces of the flanges, the sets so connected together forming longitudinally disposed zones of pre-cast units, the edges of adjacent zones being connected together by a longitudinal member cast *in situ*, in which the projecting reinforcements of the shell parts are anchored and in which the reinforcing bars of the flange portions are connected together, the said flange portions of the several zones being in line transversely so that they form suitably spaced continuous transverse members each jointed to the respective longitudinal members, substantially as described.

4. In a reinforced concrete ship, in combination, a series of pre-cast reinforced units each consisting of a shell part and two end flanged parts, reinforcing bars passing through the said flanged parts and projecting through the ends thereof and adapted with the flanges to form sections of the transverse frames of the ship, reinforcing bars in the shell portion projecting beyond the edges thereof, longitudinal frame members of the ship cast *in situ*, diagonal reinforcing frame members cast *in situ*, the said pre-cast units being connected together end to end by joints made between the faces of the flanges, the sets so connected together forming longitudinally disposed zones of pre-cast units, the edges of adjacent zones being connected together by a longitudinal member cast *in situ*, in which the projecting reinforcements of the shell parts are anchored and in which the reinforcing bars of the flange portions are connected together, the said flange portions of the several zones being in line transversely so that they form suitably spaced continuous transverse members each jointed to the respective longitudinal members, said diagonal members being cast *in situ* so as to be integral with the shell portion of the pre-cast units, and so as to pass obliquely through the flange portions of the said units and so that the ends of the reinforcing bars are connected together in the longitudinal members cast *in situ*, substantially as described.

5. In a concrete ship, and in combination with the elements of claim 1, a series of metal stirrups cast in the flanges of the pre-cast units and projecting therefrom, and an inner lining or shell secured to the faces of the said flanges by the said stirrups, substantially as described.

6. In a concrete ship as claimed in claim 2, the pre-cast units provided with slots in the flanges thereof adapted after the units are assembled to take the reinforcing bars of the secondary diagonal members, substantially as described.

7. In a concrete ship as claimed in claim 1, diagonal bracing bars extending from the base of the one flange to the tip of the other flange of the pre-cast units, substantially as described.

8. In a concrete ship as claimed in claim 1, recesses formed in the abutting edges of the flanges of the pre-cast units and a calking material inserted in the spaces formed by the said recesses, substantially as described.

9. In a concrete ship as claimed in claim 3, deck beams, deck and hatch coamings cast integral in the longitudinal frame member forming the sheer strake, substantially as described.

10. In a concrete ship and in combination with the elements of claim 6, metal stirrups cast in and projecting from the shell parts of the units and adapted to connect the reinforcing bars of the secondary diagonal members to the said shell part, substantially as described.

11. In a concrete ship and in combination with the elements of claim 3, constructing the pre-cast units with slots which aline longitudinally when the units are assembled, and secondary longitudinal frame members the reinforcing bars of which pass through the said slots, substantially as described.

In witness whereof we have set our hands in presence of witnesses.

HARRY C. RITCHIE.
MORITZ KAHN.

Witnesses to signature of Harry Clement Ritchie:
J. E. LLOYD BARNES,
JOSEPH E. HIRST.

Witnesses to signature of Moritz Kahn:
MARGURITA JONES,
JOSEPH E. HIRST.